United States Patent [19]

Plude

[11] Patent Number: 4,915,326

[45] Date of Patent: Apr. 10, 1990

[54] AIRCRAFT EXIT DOOR LOCKING SYSTEM

[75] Inventor: Leo W. Plude, Woodinville, Wash.

[73] Assignee: The Boeing Company, Seattle, Wash.

[21] Appl. No.: 387,387

[22] Filed: Jul. 31, 1989

Related U.S. Application Data

[63] Continuation of Ser. No. 135,218, Dec. 21, 1987, abandoned.

[51] Int. Cl.⁴ .................................................. B64C 1/14
[52] U.S. Cl. ................................. 244/129.5; 340/543; 292/DIG. 65
[58] Field of Search ................. 244/1 R, 118.5, 129.4, 244/129.5, 137 P; 49/394, 449; 340/543; 292/144, 201, DIG. 65

[56] References Cited

U.S. PATENT DOCUMENTS

| | | | |
|---|---|---|---|
| 4,497,462 | 2/1985 | Hamatani | 244/129.5 |
| 4,522,359 | 6/1985 | Church et al. | 244/129.5 |
| 4,552,326 | 11/1985 | Bokalot | 244/129.5 |
| 4,680,891 | 7/1987 | Perkins | 244/129.5 |

Primary Examiner—Sherman D. Basinger
Assistant Examiner—Stephen P. Avila
Attorney, Agent, or Firm—Conrad O. Gardner; B. A. Donahue

[57] ABSTRACT

An aircraft exit door locking system in which an exit door is automatically locked depending on three dissimilar inputs to a logic system. The inputs are provided from acceleration, pressure, and motion sensors and are utilized in a manner whereby any two can determine whether the lock in the passenger cabin exit door will be energized or deenergized.

3 Claims, 4 Drawing Sheets

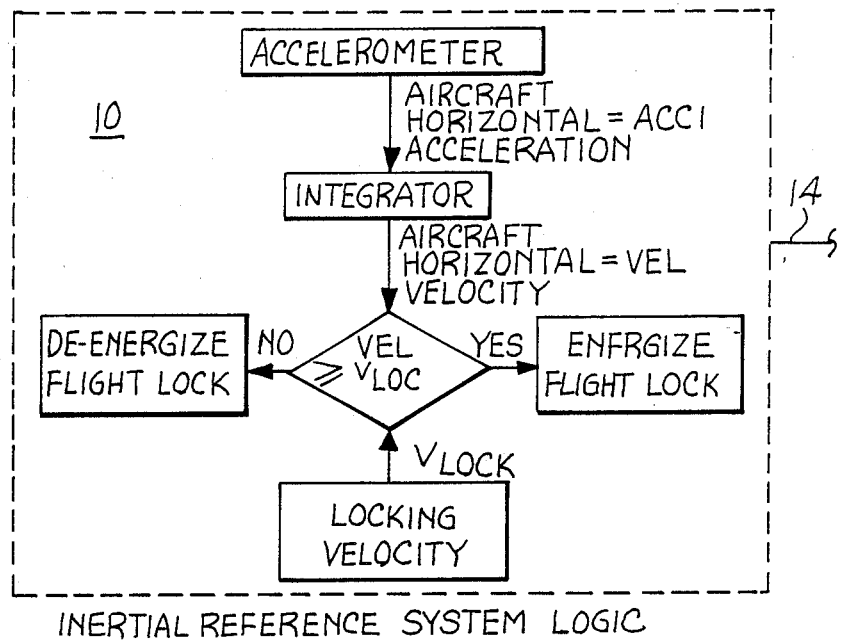
Fig. 2A INERTIAL REFERENCE SYSTEM LOGIC
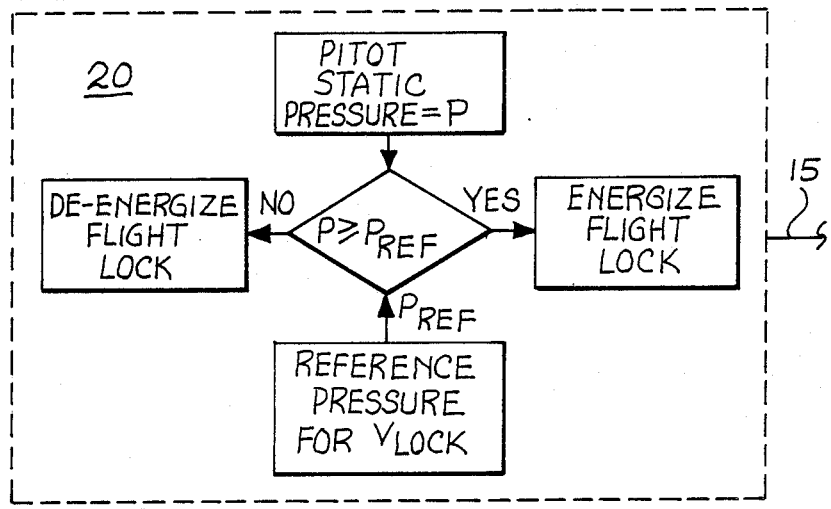
Fig. 2B PITOT SYSTEM LOGIC

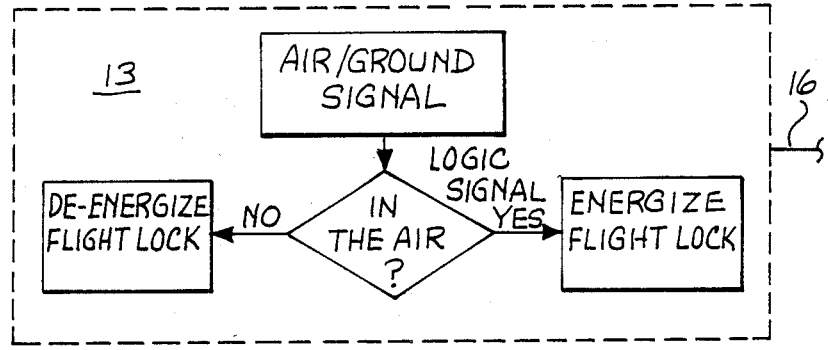
AIR/GROUND SYSTEM LOGIC
Fig. 2C
Fig. 3
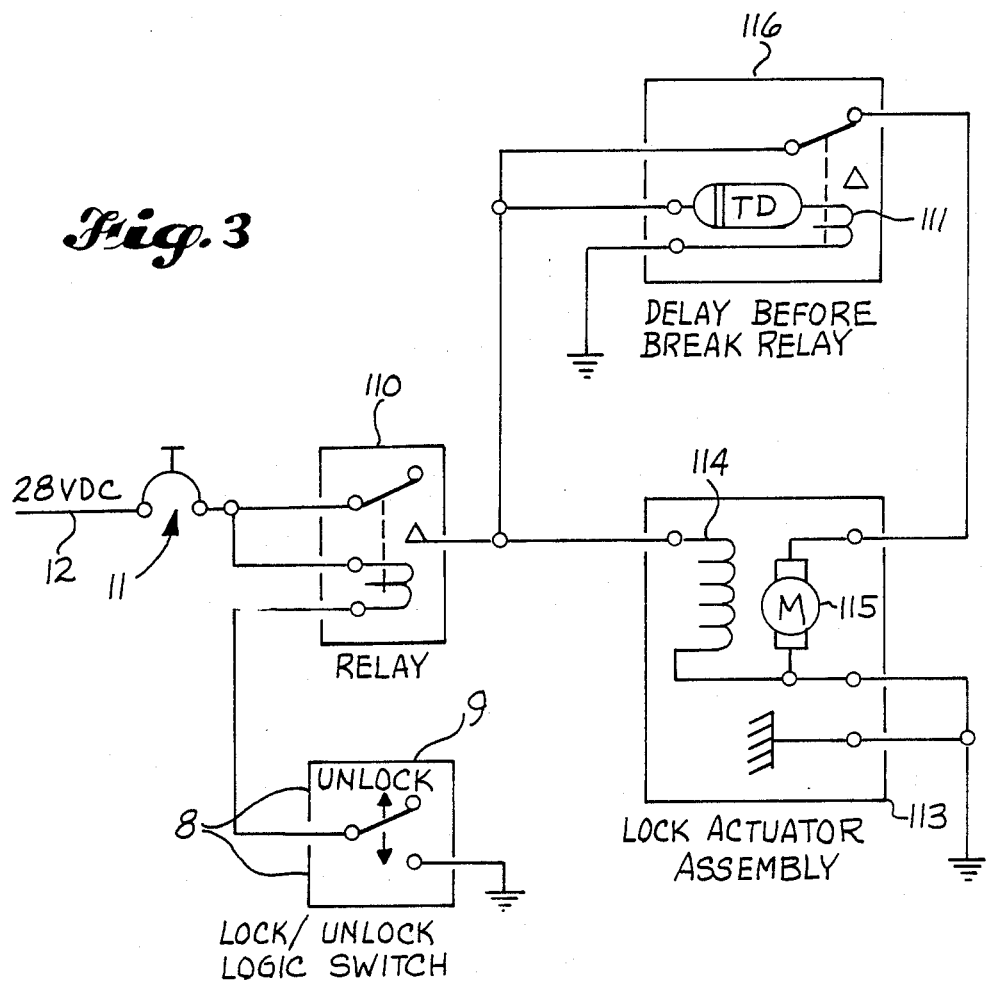

AIRCRAFT EXIT DOOR LOCKING SYSTEM

This is a continuation of application No. 07/135,218 filed Dec. 21, 1987, and now abandoned.

BACKGROUND OF THE INVENTION

1. Field of the Invention

This invention relates to aircraft exit door locking systems and, more particularly, to automatic locking systems which prevent inadvertent operation of aircraft exit opening means during flight.

2. Description of the Prior Art

Currently, Part 25 of the Federal Aviation Administration (F.A.A.) Regulations requires that aircraft exits be protected against inadvertent opening in flight by persons. The F.A.A. Regulations also require that operation of a single handle be used to open an aircraft exit. The requirement for a single handle prevents the use of manually operated locks to prevent handle operation.

To meet these requirements, aircraft exits have previously been designed such that pressurization loads in flight prevent operation of the handle. However, the point where pressurization loads exceed the mechanical advantage at the handle, occurs after the aircraft has become airborne and pressurized to the appropriate level. The altitude at which the exit becomes locked is variable due to pressurization schedule, atmospheric conditions and exit linkage design.

Further prior designs have incorporated a flight lock system which was activated by air/ground logic controlled by the landing gear truck tilt. As the aircraft main body and wing landing gear departed the ground the rotation of the gear trucks would activate switches which in turn would energize an electromechanical actuator thereby rotating a pawl into a position of interference with the exit handle thus preventing rotation while in flight.

U.S. Pat. No. 3,829,834 is representative of the patent literature prior art and shows a predetermined combination of manually operated switches to actuate a motor for unlocking purposes.

It is accordingly an object of the present invention to provide an automatically engaged and disengaged exit door flight lock system.

SUMMARY OF THE INVENTION

A preferred embodiment of the present invention comprises a fail operational, triple voting logic section receiving triple dissimilar inputs which activate the locking assembly. The dissimilar inputs originate from acceleration, pressure and motion sensing. Acceleration, pressure and motion sensing is accomplished by three independent systems; inertial reference, pitot and air/ground systems respectively. Each sensing system makes a decision as to whether the locking assembly should be energized or deenergized. By the use of four NAND gates the three decisions are voted on before the locking assembly is commanded energized or deenergized. As long as at least two or more decisions agree the majority decision is released to the locking assembly. Should one decision disagree (e.g. the air/ground system decision is to energize the locking assembly during a gear up landing and the other two systems say deenergize) the one in disagreement is overruled. This provides a automatic fail operational system which does not require pilot intervention to deenergize the locking assembly on the ground. Similarly, if one system should fail in flight (e.g. the pitot system) the remaining two systems will ensure the exit remains locked.

The present invention also addresses the problem of motor fatality. Once a decision to energize is released, the DC motor and an additional electromagnet are energized. A short period of time after locking, the power to the DC motor is disconnected by the use of a time delay relay. The electromagnet, which is more robust, tolerant of thermal cycling and devoid of brushes, then maintains the locked condition until a signal to deenergize is commanded or electrical power is removed either by the pilot or loss of the aircraft engines. Once this happens, a spring integral to the actuator, an external spring on the locking pawl and the weight of the pawl ensure the locking assembly is reliably and automatically unlocked so that exit egress is possible.

An added feature of the triple voting logic is that the total flight lock system is not sensitive to timing of the decisions. Since the point at which the initial reference system, pitot system and air/ground system make their respective decisions to energize or deenergize are a function of external constraints (e.g. atmospheric pressure, altitude, pilot decision to lift off the runway, etc...) the chance that they will all agree simultaneously is very remote. The majority decision will rule. Therefore, on landing, for example, the flight lock system will remain locked until at least two decisions change states. The remaining decision is overruled if in disagreement.

BRIEF DESCRIPTION OF THE DRAWINGS

FIGS. 2A, 2B, and 2C represent the inertial reference system logic, pilot system logic and air/ground system logic shown in block diagram form in FIG. 1;

FIG. 3 is an electrical schematic of the aircraft flight lock system responsive to the logic decision shown in the embodiment of FIG. 1.

DESCRIPTION OF THE PREFERRED EMBODIMENTS

Figure 1:
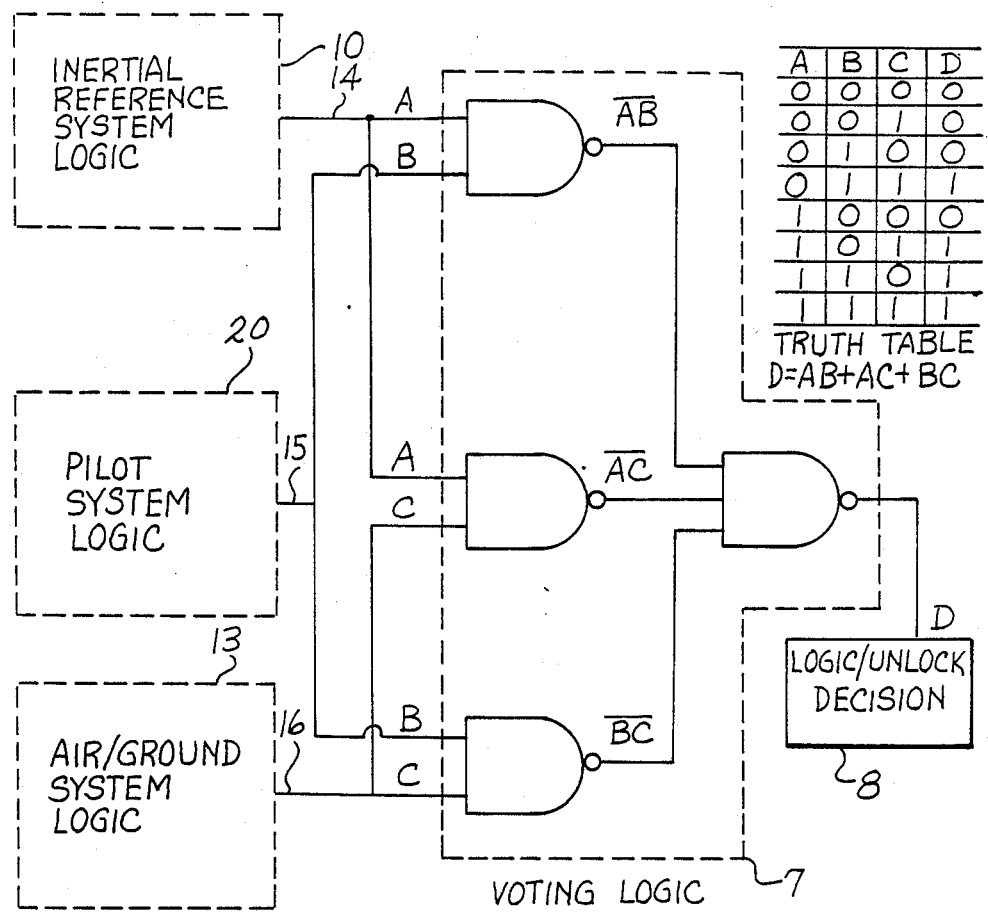
FIG. 1 is a diagram illustrating the inputs and decision logic section for a fail operational triple voting aircraft exit flight lock system utilizing triple dissimilar inputs.

As illustrated in the embodiment of FIGS. 1, 2A, 2B, and 2C, three dissimilar inputs are sensed and interpreted by three dissimilar systems. The first input logic system is the inertial reference system 10 shown in detail in FIG. 2A. In this system horizontal aircraft acceleration is sensed by an accelerometer. The accelerometer output is then input into an integrator which continuously outputs the current horizontal aircraft velocity. This velocity is then compared to a reference velocity at which the aircraft exit flight lock system should either change state from deenergized to energized or vice versa. The reference velocity at which state change occurs can either be aircraft rotation speed or some other convenient velocity sufficiently high to prevent spurious signals, due to wind gusts, from energizing the aircraft exit flight lock system. The resulting decision 14 to energize or deenergize from the inertial reference system logic 10 is then input into the voting logic section 7 of the aircraft exit flight lock system where it and the remaining two system logic decisions are voted on.

The second input logic system is the pitot system 20. Aircraft horizontal velocity is sensed by a pitot static probe unit which outputs an electrical signal corresponding to the measured delta pressure. This pressure is then compared to a reference pressure corresponding to the velocity at which the aircraft exit flight lock system should change state. As in the inertial reference system, the reference pressure should be high enough to prevent spurious signals. The resulting signal to energize or deenergize from the pitot system logic 15 is then input into voting logic section 7 of the aircraft exit flight lock system where it is voted on along with the inertial reference system logic decision 14 and the logic decision 16 from the third system 13.

The third system 13 comprises an air/ground system known in the prior art. In this system, either the rotation of the main landing gear truck or extension of the main landing gear oleo, both of which are motion inputs, activates a switch or switches. The activation of these switches determine if the landing gear have left or contacted the ground based on the previous states they were in. If the landing gear have left the ground surface a command to energize 16 is input to the voting logic section 7 where it is voted on along with the two previously mentioned logic outputs 14 and 15. Similarly, if the landing gear have contacted the ground a command to deenergize is input to voting logic section 7.

By inputting the three logic outputs 14, 15, and 16 resulting from the three dissimilar inputs into a combination of four NAND gates contained in the voting section 7 a final decision 8 to lock or unlock (i.e. energize or deenergize) the aircraft exit flight lock system is made. The voting section ensures that the majority decision is acted upon as shown in the truth table of FIG. 1. This voting eliminates the susceptability to wheel up landings. It also eliminates the timing of decision inputs into the voting section which are a function of variable external parameters such as altitude and human reaction for example. Additionally, the single failure of the air/ground system or one of the other input logic systems, does not result in the unlocking of the aircraft exit in flight. With the present invention dual failures must occur before unlocking results.

Turning to FIG. 3, the final decision 8 from voting logic 7 of FIG. 1 to lock or unlock the aircraft exit flight lock system controls the state of lock/unlock logic switch 9. When in the "LOCK" position, power from a 28 VDC source 12 energizes the coil of a relay 110 which transfers power to both the electromagnet 114 of lock actuator assembly 113 and permanent magnet DC motor 115 through the delay before break relay 116 which controls the duration of power to permanent magnet DC motor 115 of lock actuator assembly 113. A few seconds after lock actuator assembly 113 has engaged, delay before break relay 116 makes contact energizing coil 111 inside the relay which removes power to permanent magnet DC motor 115. Subsequent change of state of lock/unlock logic switch 9 to "UNLOCK" or removal of aircraft power due to loss of the aircraft engines or the manual override of the aircraft exit flight lock system by pulling circuit breaker 11, deenergizes the electromagnet thereby unlocking the exit.

Figure 4:
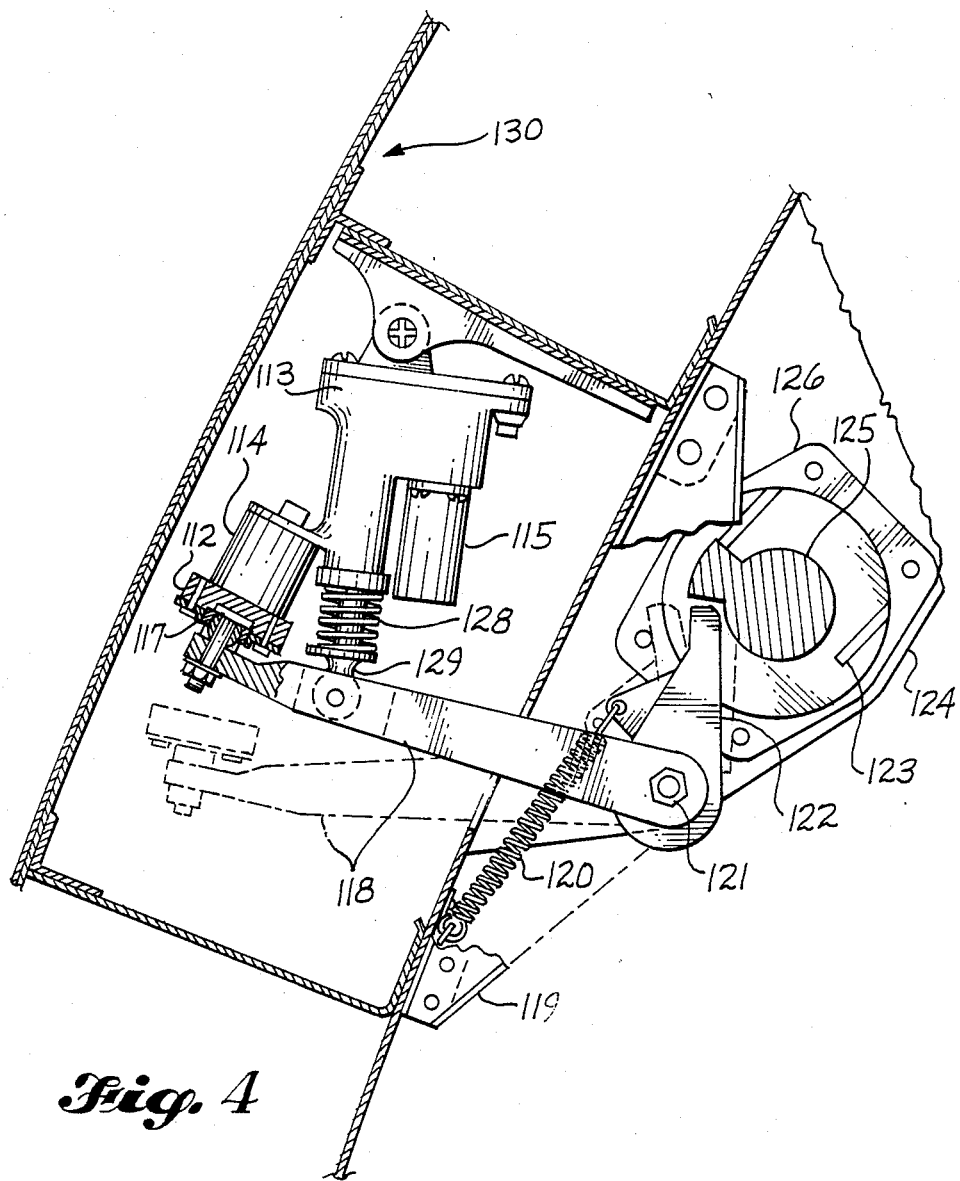
FIG. 4 is an illustration of the aircraft exit flight lock system hardware responsive to the logic and electrical inputs shown in the embodiments of FIG. 1 and FIG. 3 respectively.

Now turning to the embodiment of FIG. 4, the mechanical hardware of the aircraft flight lock system is housed in the aircraft exit structure 130. The lock actuator assembly 130, consisting of the electromagnet 114, permanent magnet DC motor 115, return spring 128, output shaft rod end 129 and other components internal to actuator assembly 113, is attached to the aircraft exit structure 130 and locking lever assembly 118. Locking lever assembly 118, consisting of magnetic target 112, swivel 117 and pawl 122, is attached to output shaft rod end 129 and to aircraft exit structure 130. As output shaft rod end 129 of lock actuator assembly 113 is extended or retracted, pawl 122 of locking lever assembly 118 is rotated about pivot 121 into a position of noninterference or interference with appendage 127 on the aircraft exit interior handle shaft 125. Pivot 121 for the locking lever assembly is between the sheet metal bracket 119 and handle box assembly 124; both of which are attached to aircraft exit structure 130. When pawl 122 is in a position of interference, the handle is prevented from rotation since it is trapped between the pawl 122 and the inside handle travel limit stops 123 on handle bearing housing 126. A spring 120 between locking lever 118 and aircraft exit structure 130 along with spring 128 on lock actuator assembly 113 and the weight of locking lever assembly 118 provides a fail operational system since each item by itself is capable of causing unlocking to occur by backdriving permanent magnet DC motor 115 and gearing internal to lock actuator assembly 113 against frictional losses and residual magnetism of the magnetic target 112 when power is removed.

Because of the long stroke required to efficiently provide clearance for handle rotation, the dual electrical components of the lock actuator are required. Electromagnets work over a very short stroke range. Therefore, to overcome the weight of locking lever assembly 118 and the dual springs 120 and 128 while providing the required stroke, permanent magnet DC motor 115 is required to retract the output shaft rod end 129 via gearing and an internal ball screw arrangement internal to the locking actuator assembly 113. The purpose of the swivel 117 is to ensure that magnetic target 112 always comes into contact with the face of electromagnet 114.

What is claimed is:

1. An aircraft cabin exit door lock control system comprising in combination:
   an exit door locking mechanism having lock and a closing motor;
   means for removing power from said closing motor after the exit door is locked;
   electromagnetic means for holding said closing motor after said exit door is locked; and,
   said control system further including lock-unlock voting logic.

2. In combination in an aircraft exit door flight lock system:
   a voting logic circuit;
   inertial reference system logic circuit means;
   pitot system logic circuit means;
   air/ground system circuit logic means;
   said voting logic circuit responsive to said inertial reference system logic circuit means, said pitot system logic circuit means, and said air/ground system logic circuit means for providing a signal representative of lock/unlock decision.

3. The invention according to claim 2 further including:
   lock/unlock logic switch means responsive to said signal representative of lock/unlock decision;
   a relay including an energizing coil;
   a lock actuator assembly including an electromagnet; and
   said lock/unlock logic switch means energizing said energizing coil of said relay means and further transferring power to said electromagnet when said lock/unlock logic switch means is in a lock position.

* * * * *